June 24, 1958     YUN GEE     2,840,795
DRIVER OR PASSENGER OPERATED CALL FOR
HELP DISTRESS SIGNAL
Filed July 30, 1957
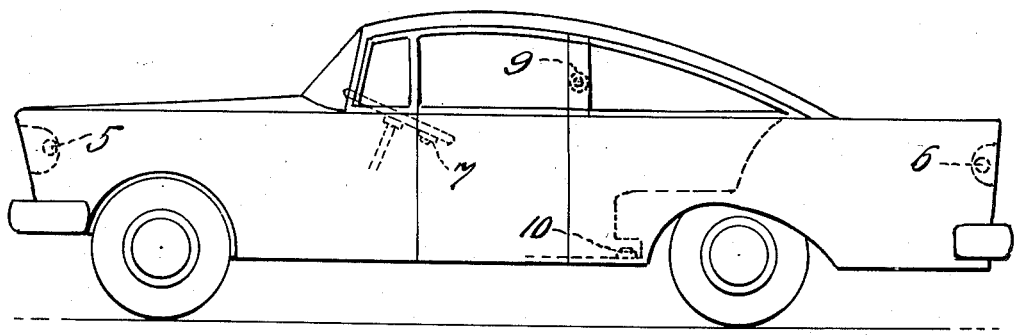
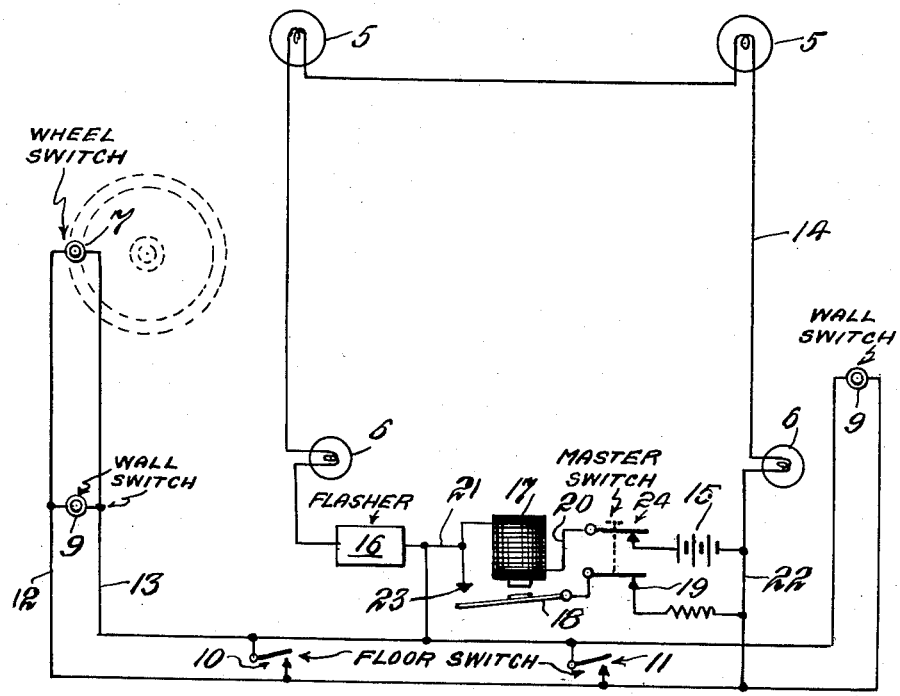
INVENTOR.
YUN GEE

United States Patent Office 2,840,795
Patented June 24, 1958

2,840,795

DRIVER OR PASSENGER OPERATED CALL FOR HELP DISTRESS SIGNAL

Yun Gee, New York, N. Y.

Application July 30, 1957, Serial No. 675,131

1 Claim. (Cl. 340—63)

The invention herein disclosed relates to signal systems and the principal objects of the invention are to provide a call for help signal system operable by passenger or driver which may be readily combined with present car lighting systems.

More specifically, it is an object of the invention to provide means by which an ordinary car lighting system may be converted to a flashing signal, recognizable as a call for help from those riding in a traveling vehicle.

Particular objects of the invention are to accomplish these and other desirable objects at low cost and in a thoroughly practical manner.

These objects are attained by combining with a lighting system of a motor vehicle, concealed or more or less concealed, switches, located in positions known to the driver and passenger and arranged to connect a flasher in one all or selected lamps of the car lighting system. These help calling signal switches may be located in concealed but accessible portions of a car body and these or a circuit closing relay connected with them may be of the self-holding type so that once actuated they will keep the help signal on until the danger is over.

The drawing accompanying and forming part of this specification is illustrative of a presently constituted form of the invention but, as will appear, the structure and arrangement may be modified and changed, all within the true intent and scope of the invention, as hereinafter defined and claimed.

Fig. 1 in the drawing is a diagrammatic view illustrating the components of the invention in a general way.

Fig. 2 is an explanatory diagram of the invention.

In the general view, Fig. 1, portions of a car lighting system are illustrated, including head lamps 5 and tail lamps 6, controlled in the usual way. Connections for effecting such control are not illustrated since these are more or less conventional.

The help calling switches may consist, as indicated, of a push button type switch 7 on the steering wheel, wall switches 9, 9 in more or less concealed but accessible positions on opposite sides of the car and foot switches 10, 11 on the floor of the car.

These several switches are connected in parallel as indicated by the wiring 12, 13 so that operation of any one of them will be effective to close the alarm circuit.

The lamps which are used for the call signal such as headlamps 5 and tail lamps 6 are connected in series by wiring 14 and in series with a local source of power such as battery 15, which latter may be the usual car battery.

A flasher 16 which may be of conventional design is interposed in the series connection 14 with the battery so that this circuit, once closed, will flash the signal lamps so long as the circuit remains closed.

A circuit closer is indicated at 17 having a contactor 18 for closing the break in the battery line at 19.

The winding of this circuit closing relay is shown connected at one side with the battery at 20 and as connected at the other side at 21 with the switch circuit line 13.

The other line 12 of the switch circuit is shown connected at 22 with the other side of the battery.

This relay may be of the self-holding type having a contact 23 to complete circuit through the winding 17 when contact 18 closes circuit across the gap 19.

A master switch is shown at 24 for opening the signaling circuit when the danger or need for using the signal system is over. This master switch may be located in a more or less concealed position within the reach of the driver.

The invention is of particular value for taxicabs, buses and other public vehicles which might be considered the more subject to hold-ups and other such forms of outlawry.

The system may be applied to such vehicles as an addition to the usual lighting system without in any way impairing or complicating such lighting systems.

The only added parts may be the circuit closing switches, flasher and necessary connections with battery, which may be the car battery and the lamps which are to be used for signal purposes.

The invention makes it possible, in the event of a hold up or other threat for the passenger or the driver or both to secretly cut the flasher in circuit with battery and the lamps selected to operate as a call for help signal. All the lamps in the car may be used in this manner if so desired. The signaling switches may be of the self-holding type or these may be push button and heel switches of the usual type and the circuit closer be of the self-holding type so as to keep the call for help lamps on with just a momentary closure of anyone of the signal switches.

With the lights flashing, whether it be day or night, police officers and other observers will be notified of trouble and may take steps to effect rescue of the riders in a traveling car.

The knowledge that cars are equipped with help calling signal systems may be considered of great value to more or less timorous persons obliged to ride in public vehicles.

As the elements used to make up the invention such as the flasher, relay switch and individually operable secret or hidden switches may be in the form of standard parts available on the market, they may be combined at low cost in kit form, ready for quick attachment to existing car lighting systems.

What is claimed is:

Signal system utilizing driving lights of a motor vehicle for broadcasting holdup of driver or passengers in the vehicle and comprising the combination with a vehicle lighting system having driving lamps, energy source and switch means for normal control of said driving lamps, a plurality of distress call switches including driver and passenger switches located within reach of driver and passengers in the vehicle, a flasher, distress call signal circuit connections from said driver and passenger switches to said flasher, driving lamps and energy source for closing a distress call circuit, flashing said lamps independently of the switch means normally controlling the same and including means for holding said distress call circuit completed when closed by any one of said driver or passenger switches and a master switch arranged to interrupt said distress call circuit from the driver and passenger switches through said flasher and to restore said vehicle lighting system to the normal control of said switch means.

References Cited in the file of this patent

UNITED STATES PATENTS

| 1,619,982 | Lucas | Mar. 8, 1927 |
| 1,716,370 | Dark et al. | June 11, 1929 |
| 2,238,246 | Chapel | Apr. 15, 1941 |
| 2,594,196 | Moledzky | Apr. 22, 1952 |
| 2,652,553 | Hollins | Sept. 15, 1953 |
| 2,782,396 | Marsh et al. | Feb. 19, 1957 |